United States Patent
Kinsey

[11] Patent Number: 6,012,247
[45] Date of Patent: Jan. 11, 2000

[54] SPRING-LOADED AUTOMATIC HOOK SETTING APPARATUS

[76] Inventor: Andrew H. Kinsey, 4958 Old Lucerne Park Rd., Winter Park, Fla. 33881

[21] Appl. No.: 09/048,461

[22] Filed: Mar. 26, 1998

[51] Int. Cl.[7] .......................... A01K 97/12; A01K 85/01
[52] U.S. Cl. ....................................... 43/16; 43/15; 43/17
[58] Field of Search ................................... 43/15, 16, 17

[56] References Cited

U.S. PATENT DOCUMENTS

| 154,141 | 8/1874 | Hill | 43/15 |
|---|---|---|---|
| 619,819 | 2/1899 | Zack | 43/15 |
| 671,914 | 4/1901 | Nesbit | 43/15 |
| 834,414 | 10/1906 | Schmidt | 43/17 |
| 885,627 | 4/1908 | Loehr | 43/16 |
| 1,934,536 | 11/1933 | Hawkinson | 43/16 |
| 1,996,704 | 4/1935 | Hawkinson | 43/16 |
| 2,567,340 | 9/1951 | Lytle | 43/15 |
| 2,921,398 | 1/1960 | Cunningham | 43/16 |
| 2,921,399 | 1/1960 | Huliew | 43/16 |
| 3,172,224 | 3/1965 | Parulski | 43/15 |
| 3,879,880 | 4/1975 | Bailey | 43/17 |
| 4,193,220 | 3/1980 | Bourquin et al. | 43/15 |
| 4,944,106 | 7/1990 | Wu et al. | 43/15 |
| 5,033,222 | 7/1991 | Chang | 43/16 |
| 5,483,768 | 1/1996 | Tessier | 43/16 |

FOREIGN PATENT DOCUMENTS

| 628415 | 10/1927 | France | 43/15 |
|---|---|---|---|
| 638747 | 6/1928 | France | 43/15 |
| 681792 | 5/1930 | France | 43/15 |
| 2657751 | 8/1991 | France | 43/17 |
| 459478 | 9/1950 | Italy | 43/16 |
| 466395 | 10/1951 | Italy | 43/16 |

Primary Examiner—Thomas Price
Assistant Examiner—Fredrick T. French, III
Attorney, Agent, or Firm—Charles E. Lykes, Jr.

[57] ABSTRACT

The invention comprises an automatic fishhook setting device wherein a lever may be engaged by the tug of a fish strike on a fishing line to release the tension of a spring. The spring will then snap the line to set the fishhook in the fish. It is possible to adjust both the spring tension and the amount of pull needed to engage the device. The device may also be mounted from a variety of fishing positions.

15 Claims, 6 Drawing Sheets

SPRING-LOADED AUTOMATIC HOOK SETTING APPARATUS

FIELD OF THE INVENTION

The invention relates to recreational and commercial fishing accessories, particularly those which are useful in the art of setting a hook in the mouth of a fish.

BACKGROUND OF THE INVENTION

Most leisure and recreational fishing is accomplished with a rod and reel. A length of line may be wound upon a reel and an end of it adapted with various accessories which are selected for a given location and type of fish to be caught. Usually, these involve the use of a form of fish bait or lure placed upon a hook. The objective is to lure or attract a fish to the bait or lure and, when the fish strikes the bait and envelopes the hook its mouth, the hook may be set in the fish's mouth with sufficient force to cause the point of the hook to penetrate the flesh of the fish through a barb along the shaft of the fishhook near the pointed end and snag the fish so that the fish may be drawn in by means of the fish line and retrieved by the fisher.

A number of inventions have been developed in order to assist in this task. Some of these teach various ways to aid in the task of ensuring that the fish hook becomes set in the mouth of the fish in order to securely retain the fish on the end of the line until drawn in and retrieved.

For instance, U.S. Pat. No. 4,730,408, issued to Miller on March 15, 1988, teaches a spring-loaded fishhook apparatus which attempts to solve this problem. Miller '408, however, requires a mount to receive and support an entire fishing rod and reel. Otherwise, the fishing line could not be secured. Miller describes a non-adjustable and complicated trigger and requires rotation of the entire rod and reel. Miller '408 can be secured to the ground by means of a stake, but there is no provision for using it from a dock or a boat.

Additionally, U.S. Pat. No. 5,076,001, issued to Coon on Dec. 31, 1991, teaches a different spring-loaded rod apparatus. In Coon a "U" shaped spring is adapted to receive a fishing rod which is capable of securing a fishing line. A trigger flange is adapted to be held on a trigger bar. A fishing line may be adapted to move the trigger bar enough to release the tension of the "U"-shaped spring and snap the rod. It is hoped that this would set the fishhook in the fish.

U.S. Pat. No. 5,249,387, issued to Slocum on Oct. 5, 1993, teaches an ice-fishing apparatus wherein a spring-loaded rod is adapted to a trigger which is similar to a rat trap. If triggered, the rod will climb and, hopefully, jerk a fishing line secured to a reel enough to set a fishhook in the mouth of a fish. Slocum is not adjustable.

Similarly, U.S. Pat. No. 5,542,205, issued to Updike on Aug. 6, 1996, and U.S. Pat. No. 5,408,779, issued to Parker on Apr. 25, 1995, teach alternative pole-mounting devices which will, when triggered, snap the rod up and set the fishhook. Each of these devices depends upon a fishing reel to secure the fishing line. Neither of these devices teaches a reliable means of adjusting the spring tension required to trigger the device and both require mounting of an entire fishing rod.

U.S. Pat. No. 5,535,538, issued to Heuke on Jul. 16, 1996, teaches an automatic jigging device. Such apparatus is meant to cause a fish lure to move in a manner to more efficiently attract fish.

While different mechanisms have been attempted in order to achieve this task. To date, none of these mechanisms are completely reliable and none of thee mechanisms are adaptable to a variety of fishing conditions, as well as a variety of means of signalling the fisher that a fish has been snagged by the apparatus.

What is needed but not provided in the prior art is a means of snagging a fish with improved reliability which is adaptable to providing a signal to the fisher that the fish has been snagged which is adaptable to the desired conditions.

SUMMARY OF THE INVENTION

The Inventor has overcome the shortcoming of the prior art and has improved on the art of automatic fish hook setting by devising an automatic spring-loaded fish setting apparatus which is both very reliable and which may be adjusted to a variety of tensions for catching different kinds of fish and may be further adapted to a number of different means of signalling a fisher that a fish has been caught.

The device generally comprises a hinged triggering apparatus which further comprises an adjustable lever against which the tension of a spring is drawn. A fishing line may be passed from the free end of the linear spring through the lever so that the pressure or pull from the strike of a fish will cause the lever to turn on the hinge and release the force of the spring to draw the line in and set the fish hook. The amount of tension or force of the fish pull required to trigger the apparatus may be adjusted by sliding the spring-engaging portion of the lever either away from or towards the hinge point of the lever in order to increase or lessen the amount of pull required to trigger the apparatus.

Once the apparatus is triggered, it is helpful to signal the fisher that the device has engaged. In one embodiment, a micro-switch detects the movement of the lever into the triggered or activated position and such may cause any number of variety of warnings to be displayed. These may include lights, audio warnings. Such sophistication is not required, however since a simple flag-type device on the apparatus itself which is within visual range of the fisher may be sufficient to this task.

It should also be noted that the apparatus may be stably secured in a variety of settings. For instance, it may be secured to a dock rail or the rail of a vessel or secured to a stake driven into the ground near a riverbank. Accordingly, the apparatus is very versatile.

It is, then, an object of the present invention to provide an automatic fish setting device of improved reliability.

It is a further object of the present invention to provide such an automatic fish-setting device in which the required activation pressure or force may be adjusted to target different kinds of fish or to adapt to different fishing conditions.

It is a further object of the present invention to provide such an automatic fish-setting device which may be adapted to provide a variety of signals or warnings that a fish has been trapped upon the device.

It is a further object of the present invention to provide such an apparatus which may be deployed from a variety of fishing positions or conditions.

Other features and advantages of the present invention will be apparent from the following description in which the preferred embodiments have been set forth in conjunction with the accompanying drawings.

BRIEF DESCRIPTION OF THE DRAWINGS

In describing the preferred embodiments of the invention reference will be made to the series of figures and drawings briefly described below.

While certain drawings have been provided in order to teach the principles and operation of the present invention, it should be understood that, in the detailed description which follows, reference may be made to components or apparatus which are not included in the drawings. Such components and apparatus should be considered as part of the description, even if not included in such a drawing. Likewise, the drawings may include an element, structure, or mechanism which is not described in the textual description of the invention which follows. The invention and description should also be understood to include such a mechanism, component, or element which is depicted in the drawing but not specifically described.

DETAILED DESCRIPTION OF THE PREFERRED EMBODIMENT

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

Figures 1, 2:
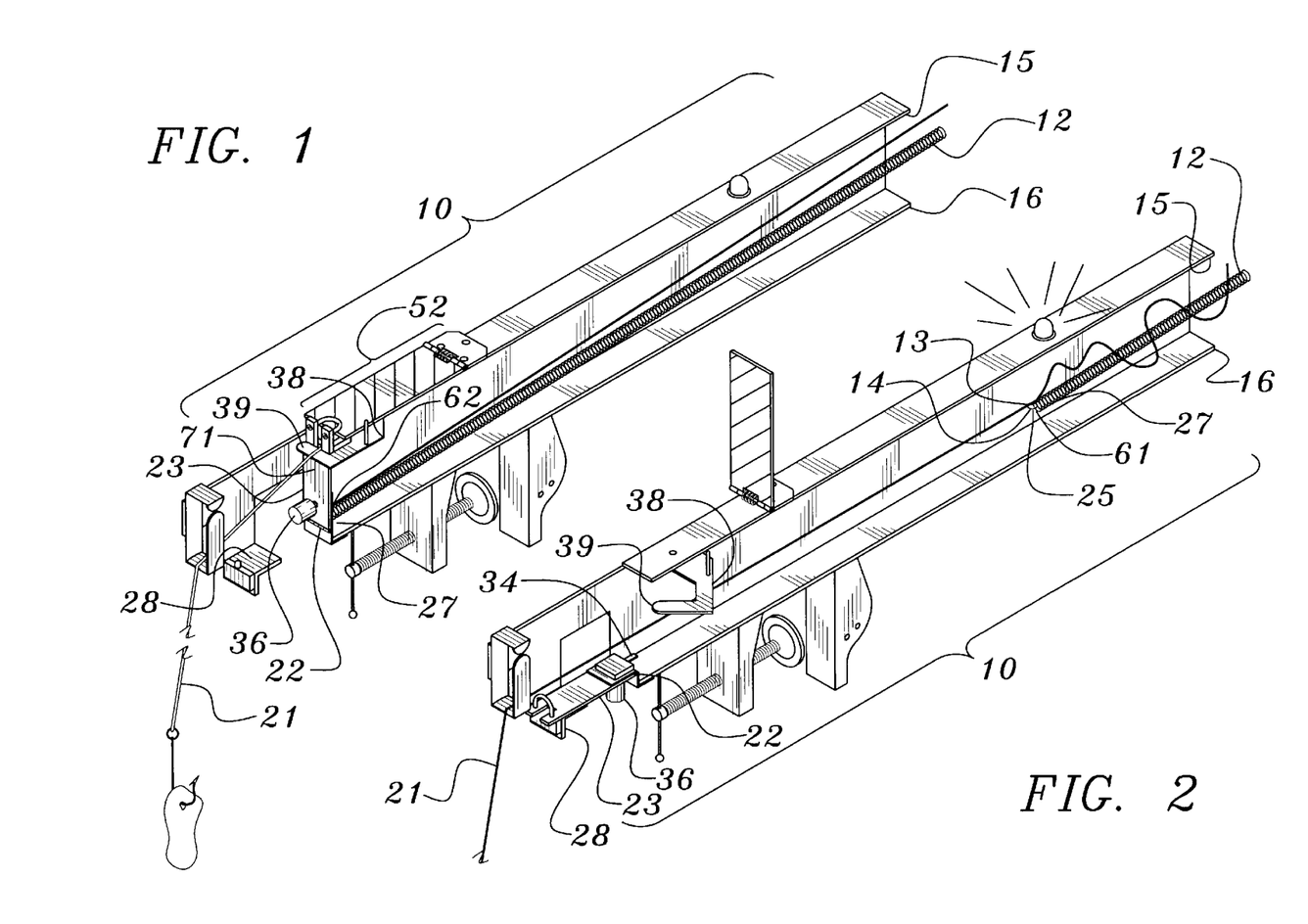
FIG. 1 is an oblique view of the basic features of the automatic fish setting apparatus which depicts the relative position of each of the main components and is in the armed position.
FIG. 2 is an oblique view of the basic features of the automatic fish setting apparatus which depicts the relative position of each of the main components and has been triggered.
Figure 3:
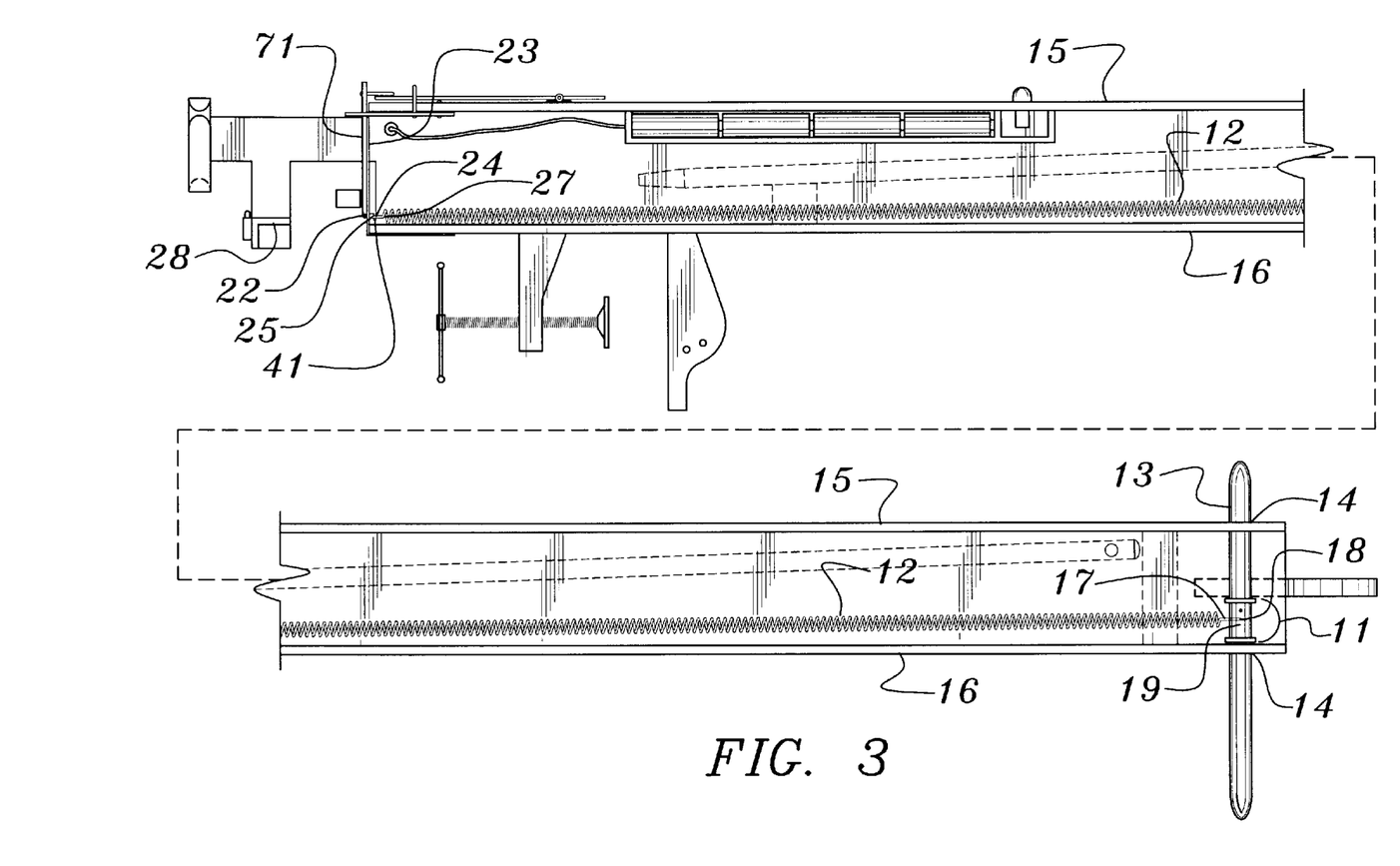
FIG. 3 is a side view of the entire apparatus.

Making reference first to FIGS. 1, 2, and 3 the general layout of the automatic fish-setting apparatus is depicted. Along and within a partially shrouded elongated shaft member (10) is positioned a linear spring mount (11) from which one secured end (17) of a linear spring (12) is mounted. The linear spring mount (11) may comprise a rod (13) which may be positioned through mounting holes (14) on opposite partially shrouding sides (15,16) of the partially shrouded elongated shaft member (10). The secured end (17) of the linear spring (12) may then be affixed to this rod (13) in any reliable fashion. Depicted is a combination of a hook (18) on the secured end (17) of the linear spring (12) which may be passed through and secured from a hole (19) in the mounting rod (17). It should be noted that a series of pairs of holes (14) could be arrayed along the opposite partially shrouding sides (15, 16) in order to accommodate different springs or to adjust spring tension, as may be described later.

The linear spring (12) may be extended from its equilibrium position (61) through the elongated shaft (10) to a spring-loaded position (62) in which the linear spring (12) is extended so as to cause the linear spring (12) to have a desired amount of potential energy with respect to its equilibrium position (61). This should be sufficient potential energy to set a fishhook in a fish without tearing the hook from the mouth of the fish. Such range allows a wide degree of latitude and such is not considered to pose a significant problem.

The free end (27) of the linear spring (12) is adapted with mounting holes (14) as a means of securing a fishing line (21). Accordingly, by releasing the fishing line (21), the linear spring (12) may be allowed to return to its equilibrium position (61).

Further along the elongated shaft (10) from the linear spring (12) in its equilibrium position (61) is positioned the hinge (22) of a triggering lever (23). The hinge (22) is positioned so as to allow the triggering lever (23) to rotate from a point (71) along the elongated shaft (10) about an axis (72) which is perpendicular to the linear disposition of the linear spring (12). The rotation of the triggering lever (23) is restricted so that it may be rotated from a position (81) which is generally upright and perpendicular to both the axis of rotation and the line of the linear spring (12) and then through a portion of a plane of rotation which is away from the linear spring (12) to a point (28) where the triggering lever (23) engages signalling means, such as a micro-switch (51).

Between the hinge (22) and along the length of the triggering lever (23) is positioned a spring-receiving peg (24). The spring-receiving peg (24) is adapted to allow a retaining loop (25) of the extended linear spring (12) in its engaged position (62) to rest against it and to hold the triggering lever (23) in its upright position. Also, while the triggering lever (23) is in the upright, or armed position, it may be engaged by a safety catch (38) which may rotate from the upper shrouding side (15) and be further adapted with a surface (39) for holding the triggering lever (23) in place as the linear spring (12) is attached to the receiving peg (34).

The spring-receiving peg (24) may be stationary or it may be adjusted along a range of positions along the length (31) of the triggering lever (23) from a spring-receiving position (32) which is very close to the hinge (22) to one which is farther away (33). From a basic understanding of the principles of a lever, it can be seen that the spring receiving peg (24) must be between the hinge (22) and the far end (36) of the triggering lever (23) or the triggering lever (23) could not be held in an armed position. It can also be seen that 1he nearer the spring receiving peg (24) is to the hinge (22), the less pull or force will be needed on the line (21) to rotate the triggering lever (23) and, conversely, the farther the spring receiving peg (24) is from the hinge (22), the more pull will be needed. This allows the triggering lever (23) to be optimally adjusted to avoid inadvertent activation due to ambient water current or the nibbling of small fish or to make it sensitive to the pull of smaller or quick striking fish.

The fishing line (21) may be secured to the fastening loop (41) of the linear spring (12) and then over the top of the lever (31) and then allowed to extend outward with fishing bait and tackle to a desired fishing region of a body of water (not depicted).

At this point, the tension of the linear spring (12) holds the triggering lever (23) in the upright, or armed position (96) and the free, or deployed end (not depicted) of the fishing line (21) may drift in the water. If, however, the strike of a fish causes a tug on the line (21) which is sufficient to overcome the tension of the linear spring (12) on the triggering lever (23), the triggering lever (23) will rotate so as to allow the spring-fastening loop (41) to come free from the spring-receiving peg (24) of the triggering lever (23), thereby releasing the tension of the linear spring (12) to forcefully tug the fishing line (21). When this occurs, the fish hook (not depicted) will be caused by the snap of the line to be set into the fish.

When the triggering lever (23) falls from the armed position and is free from the tension of the linear spring (12), it may make contact with a micro-switch (51) or it may trigger a spring-loaded flag (52) or it may do both of these. The micro-switch (51) could activate either a warning light or an audio warning alarm of some kind (53) so that a person nearby will know that the device has been triggered and to pull in the fish which has been set upon the hook.

The operation of the triggering lever (23) and adjustable tension apparatus should be described. Making reference to FIGS. 7 and 8, the spring-retaining peg (34) of the lever (31), as has been described, may be moved from a point very near the hinge (22) to one which is more distant (25) from it. The closer this point is to the hinge (22), the smaller the force of the pull on the line is required to cause the apparatus to be triggered. Accordingly, if a person is fishing in very calm water for smaller fish, then it may be advantageous to position the spring-retaining apparatus as close to the hinge (22) as possible. This is because it is likely that only a fish would be disturbing the line.

Figure 7:
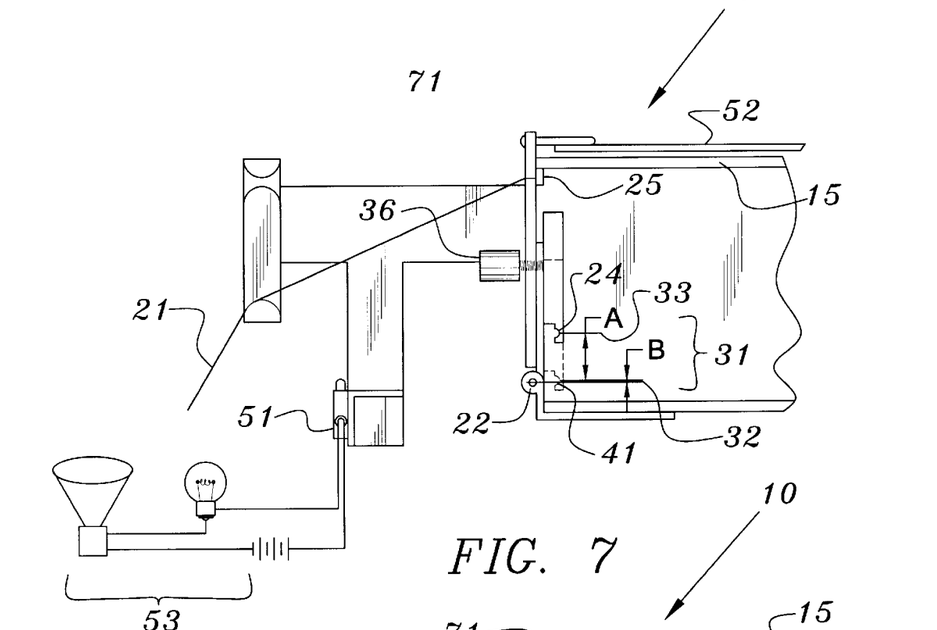
FIG. 7 is a side close up depiction of the hinge and triggering lever apparatus in the armed position.
Figure 8:
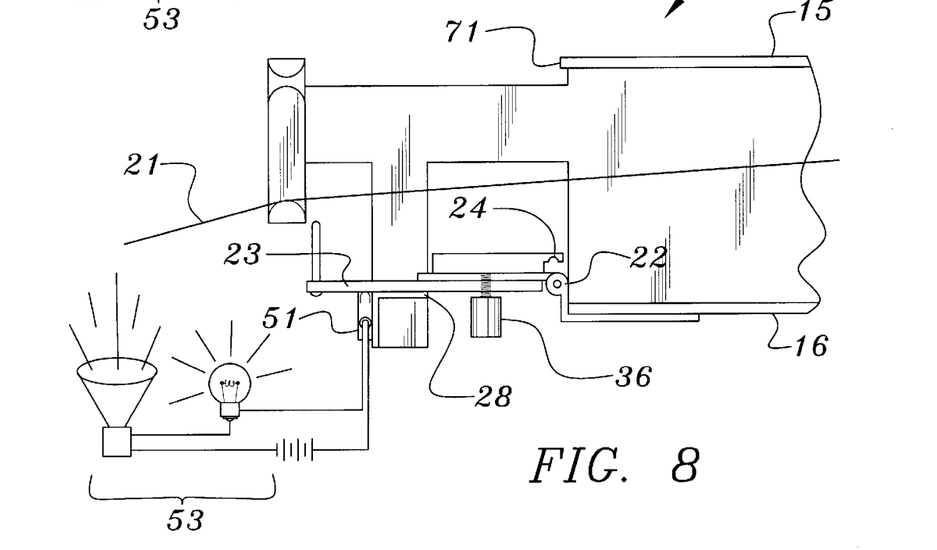
FIG. 8 is a side close up depiction of the hinge and triggering lever apparatus in the engaged position.

If, on the other hand, a person was fishing in turbulent water, it would be advantageous to increase the pull force on the line sufficient to prevent the apparatus from being triggered just from the pull of the current on the fishing line (21) or tackle. Additionally, if it was desired to avoid triggering the device just from the nibbling of smaller fish or minnows and to ensure that only larger fish would be set by the device, the spring could be turned up high enough to avoid the undesired triggering and to prevent triggering of the device from anything but larger catches.

Unlike standard rod and reel apparatus, it is generally necessary for at least the shaft (10) assembly of this apparatus to remain relatively still and rigid during the operation of catching a fish so that the various components remain in a stable relationship with one another until triggered. Accordingly, while some freedom of movement of the device is possible, it should be mounted in a stable way and must be secured with at least sufficient strength to avoid a fish pulling it away.

Within these parameters, however, a number of possibilities exist. For instance, making reference to FIG. 4, it may be possible to use a stake (81) on a pivot (82) so as to drive the stake in the ground in a location such as a river bank or the shore of a lake and deploy the device from there.

Figure 4:
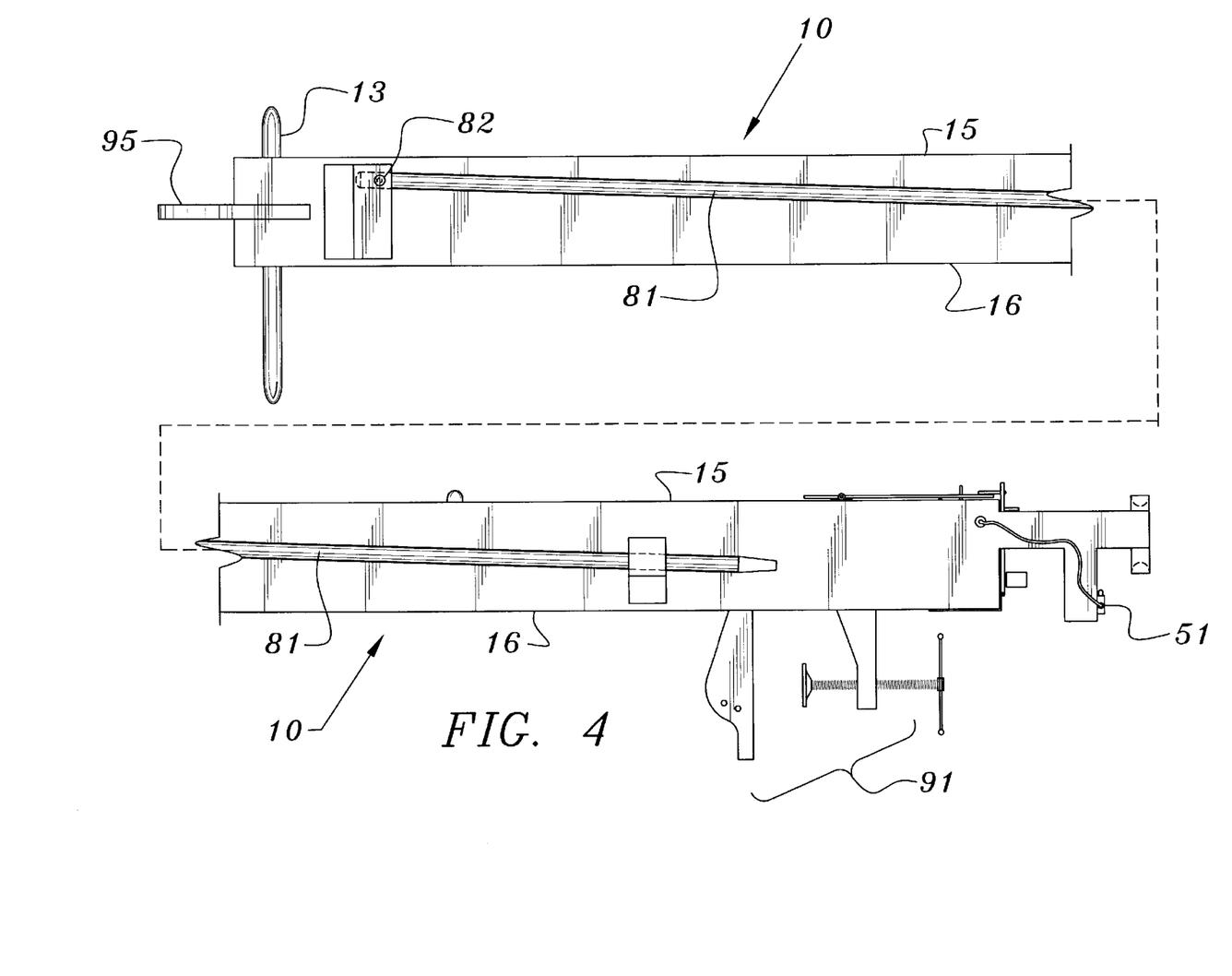
FIG. 4 is a view of the back of the shaft which depicts the relationship of the hinge apparatus, the lever, and a micro-circuit which may be used to trigger a signal.

Alternatively, again making reference to FIG. 4, the device could be adapted with a clamping means (91). The clamping means (91) could be used to secure the device to a boat or dock rail or a portion of a seawall. Additionally, such a clamping means (91) could be used in conjunction with either a stake or hanger as described above to ensure a desirable orientation. Any combination of these securing methods could be used, or others as the situation may require, in keeping within the spirit and scope of the present invention.

Figure 5:
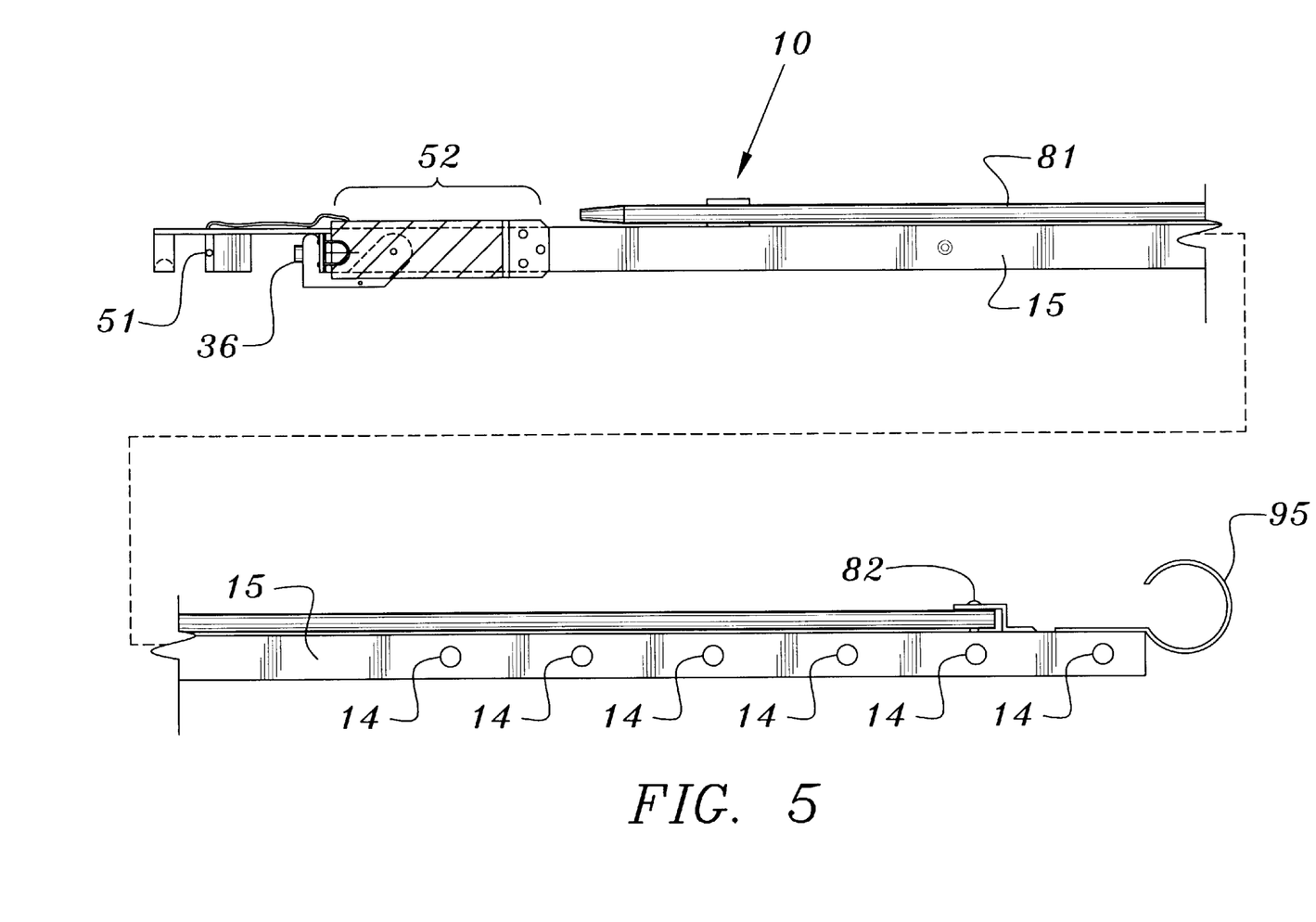
FIG. 5 depicts the top of the apparatus.
Figure 6:
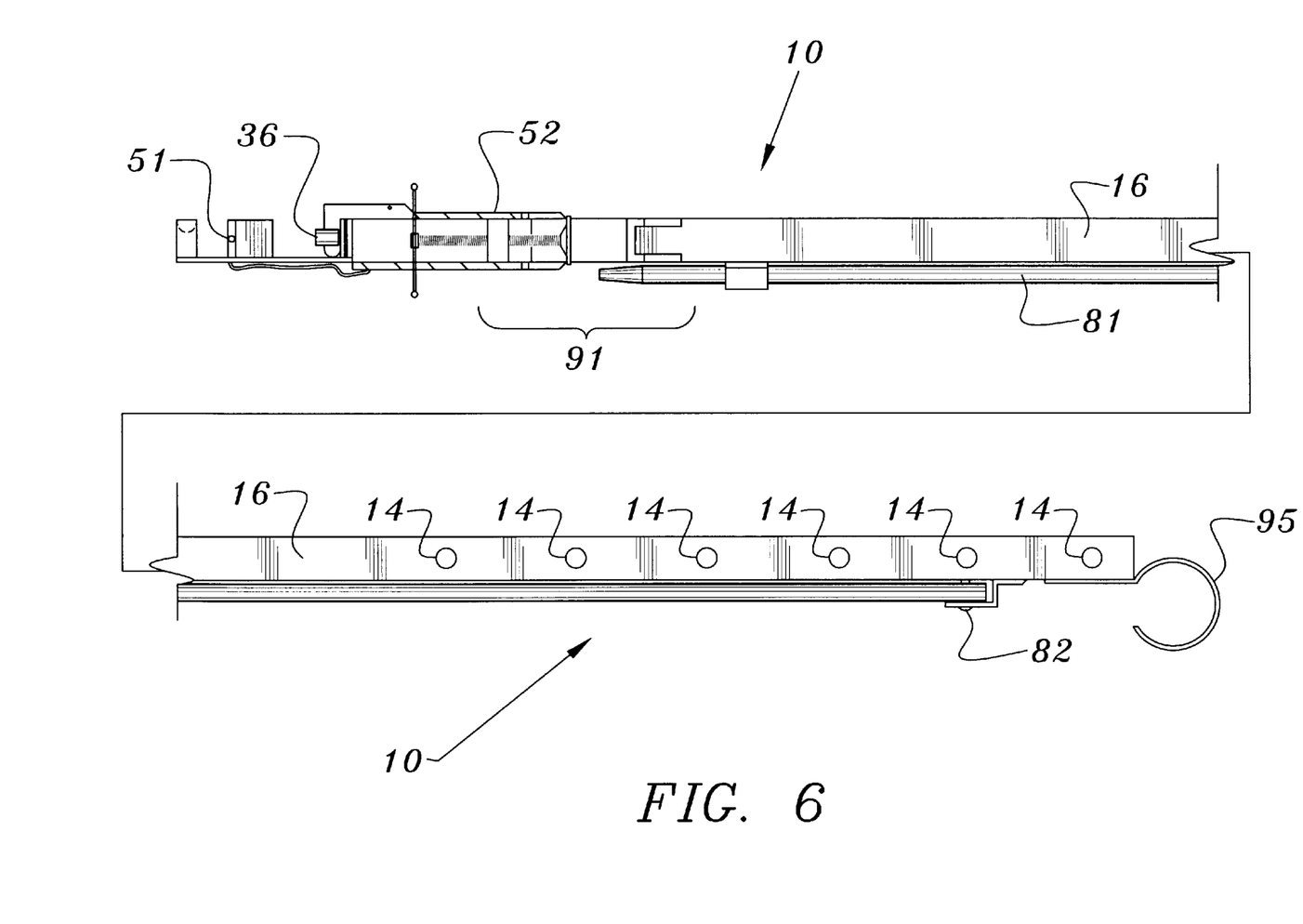
FIG. 6 depicts the bottom of the apparatus.

Alternatively, making reference to FIG. 5, the device could simply be hung by a loop (95) from a rail (not depicted) of a dock or a boat. If this were to be done, it should be hung from the same end as that from which the linear spring (23) is secured and must be positioned in such a way that the pull of the fish line will necessarily act against the triggering lever (23). This may require a guiding apparatus (not depicted) for the fish line (21) to keep it in the proper relationship with the upper or free end (27) of the triggering lever (23).

It should be noted that reference has been made to a micro-switch and various types of signalling and alarm devices, both visual and audible. Such devices are well known in the prior art and no attempt is made to separately teach or claim such devices, apart from the present invention, is intended here. It is sufficient to understand that any means of detecting the movement of the trigger lever and to use such movement to activate a proximate or remote signalling apparatus may be used in keeping within the spirit and scope of the present invention.

It should also be noted that the spring tension need not necessarily be furnished by a linear spring. For instance, a coil spring could be positioned at the appropriate place along the shaft with sufficient linear range to allow the appropriate positioning of a line. As this may be readily envisioned, no depiction of such an embodiment is herein provided.

Additionally, the spring tension may be adjusted simply by using more or less taught or rigid springs as may be desired. Finally, it should be noted that the apparatus may be made in a variety of sizes as the situation may dictate. It can readily be envisioned that smaller models may be made for freshwater fishing for small game fish and larger models for larger sea fish which are sought in rough waters and at great depths.

Further modification and variation can be made to the disclosed embodiments without departing from the subject and spirit of the invention as defined in the following claims. Such modifications and variations, as included within the scope of these claims, are meant to be considered part of the invention as described.

What is claimed is:

1. A spring-loaded fishhook setting apparatus, the apparatus comprising;

a fishing line, said fishing line being adapted with a fishhook on one end and attached to a spring on the other end;

said spring being adapted to be mounted from one end upon a housing so that it may be stretched and a free end which may be received by a receiving peg mounted upon a trigger lever and, at said free end, receive said fishing line and further, when released from said receiving peg, said spring may contract and pull said fishing line through a line guiding means, said trigger lever further comprising a rotational hinge about which a flat planar trigger member may rotate, said flat planar trigger member being adapted to rotate from an armed position in which said spring is held stretched to an engaged position from which said spring may be released to contract and pull said fishing line and said trigger member may engage a signaling means;

said line guiding means further comprising means of routing said fishing line through a path from said spring end and through said trigger lever so as to cause said flat planar trigger member to rotate when pulled with sufficient force from said fishhook end; and said signaling means further comprising a spring-loaded arm which is held down when said flat planar trigger member is in the armed position and is released when said trigger member is engaged to reveal a visible surface.

2. The spring-loaded fishhook setting apparatus described in claim 1 in which said receiving peg runs near and substantially parallel to said trigger lever and may be adjusted from a position which is very near said hinge along said trigger lever to a point along said trigger lever distant from said hinge.

3. The spring-loaded fishhook setting apparatus described in claim 1 in which said housing is adapted with a hook in order to allow the apparatus to be suspended from any of the following:

the rail of a boat, the rail of a dock; or a rail of a seawall.

4. The spring-loaded fishhook setting apparatus described in claim 1 in which said housing is adapted with a stake in order to allow the apparatus to be secured by staking the housing into the ground by a target body of water.

5. The spring-loaded fishhook setting apparatus described in claim 1 in which said housing is adapted with a clamp in order to allow the apparatus to be secured by clamping the housing onto any of the following:

the rail of a boat, the rail of a dock; or a rail of a seawall.

6. A spring-loaded fishhook setting apparatus, the apparatus comprising;

a fishing line, said fishing line being adapted with a fishhook on one end and attached to a spring on the other end;

said spring being adapted to be mounted from one end upon a housing so that it may be stretched and a free and which may be received by a receiving peg mounted upon a trigger lever and, at said free end, receive said fishing line and further, when released from said receiving peg, said spring may contract and pull said fishing line through a line guiding means, said trigger lever further comprising a rotational hinge about which a flat planar trigger member may rotate, said flat planar trigger member being adapted to rotate from an armed position in which said spring is held stretched to an engaged position from which said spring may be released to contract and pull said fishing line and said trigger member may engage a signaling means;

said line guiding means further comprising means of routing said fishing line through a path from said spring end and through said trigger lever so as to cause said flat planar trigger member to rotate when pulled with sufficient force from said fishhook end;

said signaling means being adapted to activate apparatus for signaling that said spring has been released; and in which said receiving peg runs near and substantially parallel to said trigger lever and may be adjusted from a position which is very near said hinge along said trigger lever to a point along said trigger lever distant from said hinge.

7. The spring-loaded fishhook setting apparatus described in claim 6 in which said signaling means further comprises a microswitch which may be activated by the contact with said trigger lever which results from the engagement of said trigger lever, said microswitch being adapted to activate a visual signal.

8. The spring-loaded fishhook setting apparatus described in claim 6 in which said signaling means further comprises a microswitch which may be activatedby the contact with said trigger lever which results from the engagement of said trigger lever, said microswitch being adapted to activate a visual signal.

9. A spring-loaded fishhook setting apparatus, the apparatus comprising;

a fishing line, said fishing line being adapted with a fishhook on one end and attached to a linear spring on the other end;

said linear spring being adapted to be mounted from one end within an elongated housing so that it may be stretched and a free end which may be received by a receiving peg mounted upon a trigger lever and, at said free end, receive said fishing line and further, when released from said receiving peg, said spring may contract and pull said fishing line through a line guiding means, said trigger lever further comprising a rotational hinge about which a flat planar trigger member may rotate, said flat planar trigger member being adapted to rotate from an armed position in which said spring is held stretched to an engaged position from which said spring may be released to contract and pull said fishing line and said trigger member may engage a signaling means;

said line guiding means further comprising means of routing said fishing line through a path from said spring end and through said trigger lever so as to cause said flat planar trigger member to rotate when pulled with sufficient force from said fishhook end;

said signaling that means being adapted to activate apparatus for signaling that said spring has been released; and in which said receiving peg runs near and substantially parallel to said trigger lever and may be adjusted from a position which is very near said hinge along said trigger lever to a point along said trigger lever distant from said hinge.

10. The spring-loaded fishhook setting apparatus described in claim 9 in which said signaling means further comprises a microswitch which may be activated by the contact with said trigger lever which results from the engagement of said trigger lever, said microswitch being adapted to activate a visual signal.

11. The spring-loaded fishhook setting apparatus described in claim 9 in which said signaling means further comprises a microswitch which may be activated by the contact with said trigger lever which results from the engagement of said trigger lever, said microswitch being adapted to activate a visual signal.

12. A spring-loaded fishhook setting apparatus, the apparatus comprising;

a fishing line, said fishing line being adapted with a fishhook on one end and attached to a spring on the other end;

said spring being adapted to be mounted from one end upon a housing so that it may be stretched and a free end which may be received by a receiving peg mounted upon a trigger lever and,at said free end, receive said fishing line and further, when released from said receiving peg, said spring may contract and pull said fishing line through a line guiding means, said trigger lever further comprising a rotational hinge about which a flat planar trigger member may rotate, said flat planar trigger member being adapted to rotate from an armed position in which said spring is held stretched to an engaged position from which said spring may be released to contract and pull said fishing line and said trigger member may engage a signaling means;

said line guiding means further comprising means of routing said fishing line through a path from said spring end and through said trigger lever so as to cause said flat planar trigger member to rotate when pulled with sufficient force from said fishhook end;

said signaling means being adapted to activate apparatus for signaling that said spring has been released; and in which said signaling means further comprises a microswitch which may be activated by contact with said trigger lever which results from the engagement of said trigger lever, said microswitch being adapted to activate a visual signal.

13. A spring-loaded fishhook setting apparatus, the apparatus comprising;

a fishing line, said fishing line being adapted with a fishhook on one end and attached to a linear spring on the other end;

said linear spring being adapted to be mounted from one end with an elongated housing so that it may be stretched and a free end which may be received by a receiving peg mounted upon a trigger lever and, at said free end, receive said fishing line and further, when released from said receiving peg, said spring may contract and pull said fishing line through a line guiding means, said trigger lever further comprising a rotational hinge about which a flat planar trigger member may rotate, said flat planar trigger member being adapted to rotate from an armed position in which said spring is held stretched to an engaged position from which said spring may be released to contract and pull said fishing line and said trigger member may engage a signaling means;

said line guiding means further comprising means of routing said fishing line through a path from said spring end and through said trigger lever so as to cause said flat planar trigger member to rotate when pulled with sufficient force from said fishhook end;

said signaling means being adapted to activate apparatus for signaling that said spring has been released; and in which said signaling means further comprises a microswitch which may be activated by contact with said trigger lever which results from the engagement of said trigger lever, said microswitch being adapted to activate a visual signal.

14. A spring-loaded fishhook setting apparatus, the apparatus comprising;

a fishing line, said fishing line being adapted with a fishhook on one end and attached to a spring on the other end;

said spring being adapted to be mounted from one end upon a housing so that it may be stretched and a free end which may be received by a receiving peg mounted upon a trigger lever and, at said free end, receive said fishing line and further, when released from said receiving peg, said spring may contract arid pull said fishing line through a line guiding means, said trigger lever further comprising a rotational hinge about which a flat planar trigger member may rotate, said flat planar trigger member being adapted to rotate from an armed position in which said spring is held stretched to an engaged position from which said spring may be released to contract and pull said fishing line and said trigger member may engage a signaling means;

said line guiding means further comprising means of routing said fishing line through a path from said spring end and through said trigger lever so as to cause said flat planar trigger member to rotate when pulled with sufficient force from said fishhook end;

said signaling means being adapted to activate apparatus for signaling that said spring has been released; and in which said signaling means further comprises a microswitch which may be activated by the contact with said trigger lever which results from the engagement of said trigger lever said microswitch being adapted to activate an audible alarm.

15. A spring-loaded fishhook setting apparatus, the apparatus comprising;

a fishing line, said fishing line being adapted with a fishhook on one end and attached to a linear spring on the other end;

said linear spring being adapted to be mounted from one end within an elongated housing so that it may be stretched and a free end which may be received by a receiving peg mounted upon a trigger lever and, at said free end, receive said fishing line and further, when released from said receiving peg, said spring may contract and pull said fishing line through a line guiding means, said trigger lever further comprising a rotational hinge about which a flat planar trigger member may rotate, said flat planar trigger member being adapted to rotate from an armed position in which said spring is held stretched to an engaged position from which said spring may be released to contract and pull said fishing line and said trigger member may engage a signaling means;

said line guiding means further comprising means of routing said fishing line through a path from said spring end and through said trigger lever so as to cause said flat planar trigger member to rotate when pulled with sufficient force from said fishhook end;

said signaling means being adapted to activate apparatus for signaling that said spring has been released; and in which said signaling means further comprises a microswitch which may be activated by the contact with said trigger lever which results from the engagement of said trigger lever, said microswitch being adapted to activate an audible alarm.

* * * * *